Patented Apr. 26, 1932

1,855,592

UNITED STATES PATENT OFFICE

LEO WALLERSTEIN, OF NEW YORK, N. Y., ASSIGNOR TO WALLERSTEIN COMPANY, INC., OF NEW YORK, N. Y., A CORPORATION OF NEW YORK

INVERTASE PREPARATION AND METHOD OF MAKING THE SAME

No Drawing. Application filed February 3, 1926. Serial No. 85,780.

This invention relates to a preparation of invertase and a method of making the same.

In recent years there has been a considerable development in the use of invertase, more particularly in the manufacture of confectionery and syrups. A method of using invertase in the manufacture of confectionery and the results attained thereby is set forth in the patent to Paine and Hamilton, No. 1,437,816, granted December 5, 1922.

The commercial use of invertase demands what may be termed a standardized preparation, that is, a preparation which has a determined inverting power. Heretofore such preparations have been ordinarily used in the form of a purified aqueous solution containing invertase. Such solutions are, however, highly sensitive to deterioration when exposed to temperatures, say, above 50° C. and they have the further disadvantage that they are subject to attack by micro-organic growths, and, as a result, to decomposition from such attack. This has lead to the incorporation in the invertase solution of preservatives, such as toluol. The use of such preservatives, however, is objectionable for various reasons.

I have found that an invertase preparation of determined inverting power and which is far less subject to deterioration by heat and to bacterial decomposition can be produced by incorporating a protective sugar in the preparation.

When the improved invertase preparation containing a protective sugar is to be used in the form of a solution, one method of producing it may consist in preparing an aqueous invertase solution of determined inverting power and containing approximately, say 10% of solids, and in mixing with or dissolving in this solution an amount of sucrose which is sufficient to convert the solution into one containing from 70% to 80% of solids. In all cases, care should be taken that sufficient water is present to dissolve the sucrose. A part of the invertase will act to convert some of the sucrose into invert sugar and the result will be a honey-like syrup which contains sucrose, invert sugar and invertase.

The addition of sucrose as described acts as a protective agent for the invertase, so that its capacity to withstand heat is raised, and it also renders the solution less liable to attack by micro-organic growths. The syrup, therefore, is of excellent keeping quality and it will have a determined inverting power which will be controlled by the amount of invertase present in the original solution. This invertase syrup of the honey-like consistency to which reference has been made is very readily handled in both the manufacture of confectionery and syrups, and the dissolved sucrose and invert sugar which are present do not interfere with the action of the invertase or the result to be attained by its use.

A syrup such as described may be used directly in the manufacture of confectionery or of syrup and at temperatures, say, of 60° C. or somewhat over, which temperatures it has been pointed out, are liable to destroy the activity of the invertase in whole or in part if it be used in an aqueous solution.

Other sugars, such as glucose, lactose or dextrose, may be used instead of sucrose, but lactose is expensive and sucrose gives, on the whole, more satisfactory results than the other sugars referred to.

In a companion application filed of even date herewith, Ser. No. 85,781, I have described and claimed a preparation of invertase in dry or powdered form, such preparation containing a protective sugar.

What is claimed is:

1. An invertase preparation of a determined inverting power, said preparation having incorporated therein a sugar in sufficient amount to form a protective agent for the invertase.

2. An invertase preparation of a determined inverting power, said preparation having incorporated therein sucrose in sufficient amount to form a protective agent for the invertase.

3. An invertase solution of a determined inverting power, said solution having a protective sugar incorporated therein in sufficient amount to form a protective agent for the invertase.

4. An invertase solution of a determined inverting power, said solution having incorporated therein sucrose in sufficient amount to form a protective agent for the invertase.

5. An aqueous invertase solution of determined inverting power containing a protective sugar, said solution containing approximately from 70% to 80% solids, of which 60% to 70% result from the incorporation of the sugar therein.

6. The method of making an invertase solution which consists in preparing an aqueous solution of invertase containing approximately 10% solids and incorporating therein sucrose in sufficient amount to raise the percentage of solids to approximately 70% to 80%.

In testimony whereof, I have hereunto set my hand.

LEO WALLERSTEIN.